United States Patent
Skog et al.

(10) Patent No.: US 8,285,213 B2
(45) Date of Patent: *Oct. 9, 2012

(54) PROFILE AND CAPABILITY OF WAP-TERMINAL WITH EXTERNAL DEVICES CONNECTED

(75) Inventors: Robert Skog, Hässelby (SE); Erwin van Rijssen, Kista (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 13/230,204

(22) Filed: Sep. 12, 2011

(65) Prior Publication Data

US 2011/0320615 A1    Dec. 29, 2011

Related U.S. Application Data

(63) Continuation of application No. 10/296,781, filed as application No. PCT/SE01/01193 on May 29, 2001, now Pat. No. 8,041,296.

(30) Foreign Application Priority Data

Jun. 16, 2000 (SE) .................................. 0002242-6

(51) Int. Cl.
    *H04W 88/02* (2009.01)
(52) U.S. Cl. ...................................................... 455/41.2
(58) Field of Classification Search ................ 455/41.2, 455/557; 709/217, 218, 219; 370/338
    See application file for complete search history.

(56) References Cited

U.S. PATENT DOCUMENTS

| | | |
|---|---|---|
| 2004/0052233 A1 | 3/2004 | Skog et al. |
| 2009/0102649 A1* | 4/2009 | Diener et al. ................. 340/542 |
| 2009/0102653 A1* | 4/2009 | McGinnis et al. ............ 340/551 |
| 2010/0154035 A1* | 6/2010 | Damola et al. .................... 726/4 |
| 2011/0141886 A1* | 6/2011 | Lee et al. ...................... 370/230 |

* cited by examiner

*Primary Examiner* — Diane Mizrahi (57) ABSTRACT

Data communication system and a method in a data communication system comprising a terminal, e.g. a mobile phone, adapted to communicate with an application server using a wireless transmission protocol, preferably WAP, including a terminal profile. The wireless transmission protocol also includes an attached device's profile that is dynamically updated with data related to a device attached to the terminal.

23 Claims, 4 Drawing Sheets

PROFILE AND CAPABILITY OF WAP-TERMINAL WITH EXTERNAL DEVICES CONNECTED

CROSS-REFERENCE TO RELATED APPLICATIONS

This application is a continuation of U.S. application Ser. No. 10/296,781, filed Sep. 15, 2003, now U.S. Pat. No. 8,041, 296 now pending, which was the National Stage of International Application No. PCT/SE01/01193, filed May 29, 2001, which claims the benefit of SE Application No. 0002242-6, filed Jun. 16, 2000, the disclosure of which is incorporated herein by reference.

FIELD OF THE INVENTION

The present invention relates to a data communication system and a method in a data communication system in accordance with the preambles of the independent claims.

BACKGROUND OF THE INVENTION

Wireless Application Protocol (WAP) is a technology that enables wireless access to Internet applications from a terminal, preferably a mobile phone. The WAP forum, available at www.waporum.org, has defined a WAP architecture for pulling (i.e. user initiated) information from Internet (e.g. Internet browsing) and pushing (i.e. application initiated) information (e.g. sending news messages, mail notification).

Wireless Application Environment (WAE) has adopted a model that closely follows the World Wide Web (WWW) model. All content is specified in formats that are similar to the standard Internet formats. Content is transported using standard protocols in the WWW domain and an optimized HTTP-like protocol in the wireless domain, a WAP communication protocol, preferably the Wireless Session Protocol (WSP). WAE has borrowed from WWW standards including authorizing and publishing methods wherever possible.

The WAE assumes the existence of a WAP gateway with functionality responsible for encoding and decoding data transferred from and to the terminal. The purpose of encoding content delivered to the terminal is to minimize the size of data sent to the terminal over-the-air as well as to minimize the computational energy required by the terminal to process that data.

The major elements of the logical WAE model is a terminal including a WAP user agent that wirelessly communicates with a gateway that includes encoders and decoders. The WAP gateway in turn communicates with an origin server including server applications.

A WAP user agent is defined as any software or device that interprets content (e.g. Wireless Markup Language, WML) and may include textual browsers, voice browsers, search engines, etc.

Capability and Preference Information (CPI) may include hardware characteristics (screen size, color capabilities, image capabilities, etc.), software characteristics (operating system vendor and version, support for used programs, list of audio and video encoders, etc.), application/user preferences (browser manufacturer and version, markup languages and versions supported, scripting languages supported, etc.), WAP characteristics (WML script libraries, WAP version, WML deck size, etc.) and network characteristics (bearer characteristics such as latency and reliability, etc.).

A User Agent Profile (UAProf) specification extends the WAP to enable end-to-end flow of a UAProf between the terminal, the intermediate network points and the origin server. UAProf is using capability and preference information as a set of components and attributes. UAProf is transmitted over wireless networks within WSP headers.

In summary the UAProf is concerned with capturing classes of terminal preference information. These classes include the hardware and software characteristics of the terminal as well as information about the network to which the terminal is connected.

Figure 1A:
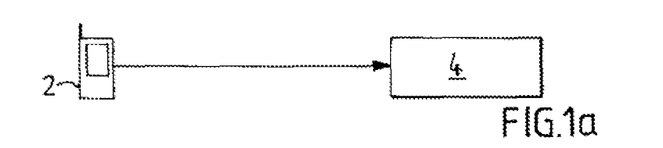
FIGS. 1a and 1b illustrate schematically the transmission and the wireless protocol, respectively, used in the prior art.
Figure 1B:
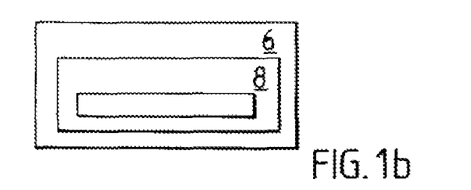

FIG. 1a shows schematically how a terminal 2, e.g. a mobile phone, establishes a mobile Internet session with an application in an application server 4 according to a well-established technique used today. FIG. 1b shows a block diagram of the UAProf 6 including a terminal profile 8 used in FIG. 1a.

When a terminal establishes a mobile Internet session with an application, it will send its User Agent Profile to this application. This profile contains the attribute values of the terminal and/or references (e.g. in the form of an Internet-address) to the application server(s) where the attribute values can be found.

The scenario described in connection with FIG. 1 shows the opening of a WSP session and establishing of an initial UAProf. Upon opening a WSP session, the UAProf-aware terminal conveys its profile information using Profile and Profile-Diff headers within the WSP connect request. The values of these headers are constructed by encoding the CPI.

While a UAProf-aware session is established, the client (terminal) may update the active UAProf at any time. To do this, the terminal transmits a WSP session resume message to the WAP gateway containing Profile and Profile-Diff headers with the new CPI.

Both in the scenario described in connection with FIG. 1 and when a UAProf is updated during an already established session the UAProf profile changes are changes to the terminal's (e.g. mobile phone's) settings or characteristics (e.g. the user may change the desired gray scale level for images, etc.).

When a WSP request is issued, the terminal may provide additional information or override or augment the basic UAProf already cached at the WAP gateway. The UAProf profile in the terminal consists of actual profile data and/or Uniform Resource Locators (URLs) pointing to the actual data stored on an origin server somewhere in the network. The latter is especially useful to point to data that is the same for all users of a particular terminal type, e.g. hardware characteristics. Standard attributes values pointed at by the URL can be overridden by attribute values explicitly specified in the terminal's profile. E.g. user preferences override standard settings. The level of overriding in UAProf is thus on attribute level.

In the UAProf specification, the terminal provided with attribute values may override the default settings stored on an origin server in the network.

In the mobile Internet world, users will increasingly have more than one user device, e.g. a laptop computer, a communicator or a mobile phone, to access an application. These user devices have different capabilities with regard to screen size, screen resolution, screen colors, memory, processor capacity, browser etc. A laptop computer and a communicator could be connected via a mobile terminal to the mobile network and are then concerned as attached devices. Furthermore, terminals could have other types of attached devices, like digital cameras, MP3 players, GPS systems, text-to speech converters etc.

In order to provide a user with a relevant and valuable service it would be necessary for the application that provides the service, to be adapted to the user's terminal and to the attached devices. This adaptation can mean that the information formatting or the information itself is adjusted to the terminal capabilities. An example of adjusting the information is when an application only sends a summary of an article in a newspaper instead of the whole article.

By terminal capability is meant the combined capability of the terminal and the attached device that in some cases only depends of the capability of the attached device.

As stated above the technique used today provides for profile changes reflecting changes to the client's (terminal's) settings and characteristics and not taking into account the capability of devices attached to the client.

The object of the invention is to be able to customize the information sent from an application server to a terminal depending of the capabilities of devices attached to the terminal.

SUMMARY OF THE INVENTION

The above-mentioned objects are achieved by the invention according to the characterizing portions of the independent claims.

Preferred embodiments are set forth in the dependent claims.

Thus, the wireless transmission protocol used for communication between a terminal and an application also includes, in addition to the terminal profile, an attached device's profile that is dynamically updated with data related to a device attached to the terminal.

The profile changes of the attached device's profile according to the present invention do not exclude changes to the terminal profile.

DETAILED DESCRIPTION OF PREFERRED EMBODIMENTS OF THE INVENTION

Figure 2:
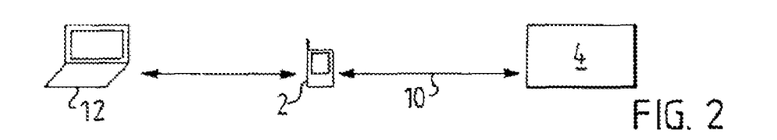
FIG. 2 is a schematic illustrating of a communication system where the present invention is applicable.

FIG. 2 is a schematic illustrating of a communication system where the present invention is applicable.

The system comprises a terminal 2, e.g. a mobile phone, adapted to communicate with an application 4 in an application server via the mobile network and the Internet 10 using a wireless transmission protocol, e.g. WAP or alternatively HTTP. In the figure is the WAP gateway between the terminal and the application server omitted for sake of clarity but it should be understood that the communication between the terminal and the WAP gateway is partly wireless. Any known communication media, e.g. the Internet, could perform the communication between the gateway and the server. According to an alternative embodiment the WAP gateway is omitted whereas there is an end-to-end communication between the terminal and the application server.

The system also comprises one or many devices 12 attached to the terminal. The attached device 12 may be e.g. a laptop computer, an MP3 player, a digital camera, a text-speech converter, a parking meter, a vending machine, a printer or any device adapted to be connected to a terminal. The attached device may be connected to the terminal 2 via any conventional electrical or optical cable or via the air interface using e.g. a short distance wireless protocol, e.g. the Bluetooth protocol, or by using an infrared link.

The connection from the terminal to the application is made via a cellular network and the Internet using for example Transmission Control Protocols/Internet Protocols (TCP/IP). The TCP/IP protocol specifies the addressing of nodes on the Internet and provides a method of sending packets of data from one node to another.

Figure 3:
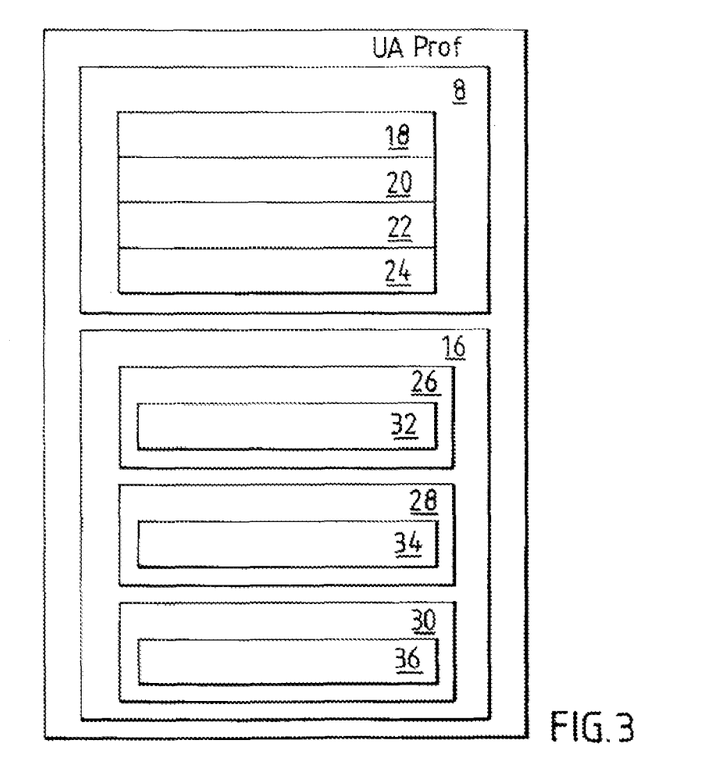
FIG. 3 illustrates a block scheme of a User Agent Profile (UAProf) according to the present invention.

FIG. 3 illustrates a block scheme of a User Agent Profile (UAProf) according to the present invention. UAProf comprises a terminal profile 8 and an attached device's profile 16. The terminal profile comprises different attributes, e.g. hardware attributes 18, software attributes 20, browser attributes 22 and auxiliary attributes 24.

The attached device's profile 16 comprises a number of components 26, 28, 30, each representing a different device. Each component is provided with relevant attributes 32, 34, 36, respectively, that may be hardware, software or browser attributes.

According to a preferred embodiment of the present invention the attached device's profile is implemented by defining a new schema in UAProf which is allowed under the specifications for UAProf. The new schema implementing the attached device's profile must comply with specifications that can be found in its entirety in "Wireless Application Group, User Agent Profile Specification" available at www.wapforum.org.

A schema includes components and components in turn comprise of attributes. A schema may be regarded as a complete profile structure/grammar. Components are e.g. "hardware characteristics", "software characteristics", "browser" and an attribute is e.g. "screen size". Thus, the schema defines the structure of the profile and the profile itself can thus be seen as instantiation of a schema: i.e. the profile is a schema filled with actual data or pointers to data. WAP UAProf uses Resource Description Framework (RDF) for defining the structure/grammar of a schema, component and attribute. The above-mentioned concept using a schema is applied according to a preferred embodiment of the invention to define an attached device's profile. E.g. when a device is attached to a mobile phone (e.g. with Bluetooth) the device informs the phone about its capabilities by sending its profile. As long as the profile sent has a schema structure that complies with the constraints specified in WAP UAProf (and RDF), the phone will be able to understand it.

Figure 4:
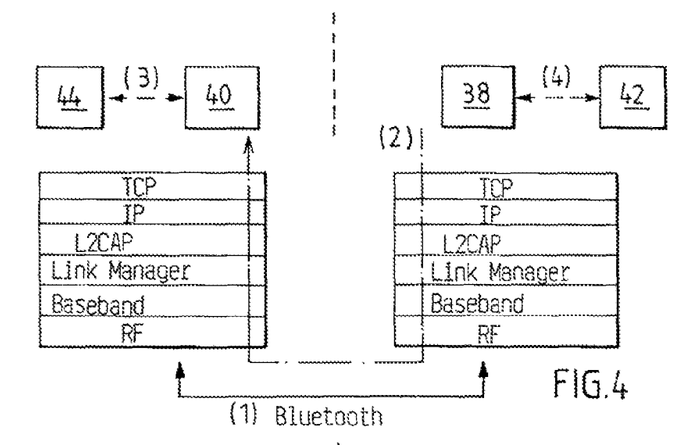
FIG. 4 illustrates a preferred embodiment of the invention where an attached device is wirelessly attached to the terminal using the Bluetooth protocol.

According to a preferred embodiment of the invention the attached device is wirelessly attached to the terminal using the Bluetooth protocol for communication. This connection is schematically illustrated in FIG. 4. FIG. 4 shows capability handlers 38, 40 and capability data means 42, 44 arranged in a terminal (to the right in the figure) and in an attached device (to the left), respectively. The capability handler updates the capability data means in response of an attached device's profile received from an attached device. This update is made either in that the attached device automatically sends its profile to the terminal when it is connected or in that the terminal sends a terminal capability request to the attached device requesting the device's profile.

In FIG. 4 the terminal requests the profile from the attached device. The TCP/IP on top of the Bluetooth protocol is used. The following procedure is performed with references to FIG. 4:

(1) A Bluetooth connection is established.

(2) The capability handler 38 in the terminal discovers that there is a new device attached and sends a terminal capability enquiry request to the attached device. The request is handled by an attached device capability handler 40.

(3) The attached device capability handler 40 reads its capability data (i.e. the attached device's profile) from an attached device capability data means 44 provided in the attached device and sends it back to the terminal in response of the terminal capability enquiry request.

(4) The terminal's capability data means 42 is updated with the received profile.

Figure 5:
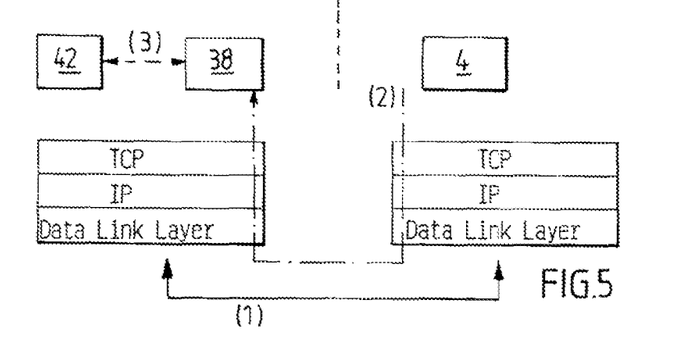
FIG. 5 schematically illustrates the communication between a terminal and an application server according to the present invention.

FIG. 5 schematically illustrates the communication between a terminal 2 and an application server 4 comprising an application. If devices are attached to the terminal the capability data means is provided with the attached device's profile. The capability data means may be updated in many different ways, e.g. according to the above-described procedures.

According to a preferred embodiment of the invention the application server requests from the terminal its capabilities (profiles) both regarding the terminal itself and any attached device's capabilities (profiles). This request may be transmitted via a WAP gateway or other nodes using other protocols. The part of the radio protocol used in the intermediate nodes between the terminal and the application server is not a part of the present invention and is therefore not described herein.

The following procedure is performed with references to FIG. 5:

(1) A pre-requisite is that a data channel is established between the terminal (mobile phone) and the application server using packet data or circuit data. Other protocol such as WAP on SMS could also be used.

(2) An application would like to find out the capability of the terminal and sends a terminal capability enquiry request to the terminal. The capability handler in the terminal is connected to the TCP stack via a port number. The application sends the request to that port number on the terminal and the request ends up in the capability handler in the mobile phone. This addressing is well known technology and is therefore not further described herein.

(3) The terminal's capability handler then reads out the capability data (profile) from the capability data means, including both attached devices' capabilities and terminal's capabilities, and sends the result (the profile) back in response to the terminal capability enquiry request.

The attached devices or ad-hoc devices may be divided in three different types: substituting devices, complementary devices and sporadic devices. The type of device determines whether or not the capabilities of the devices will influence the profile of the used wireless protocol.

The profile of a substituting device (partly) overrules (overrides) some of the mobile phone's profile attributes (e.g. when a laptop is attached, the laptop's hardware/software/browser attributes can overrule the phone's attributes when a session is set-up).

The profile of a complementary device is an addition to the mobile phone's profile.

The profile of a sporadic device is not included in the mobile phone's profile since this device cannot be considered an add-on to the phone's device to be taken into account by the application when deciding on information format and content. Examples of sporadic devices are a parking meter, a vending machine or a printer.

Apart from the situation described in connection with FIGS. 1a and 1b, which is already used today, five principally different situations or scenarios will be described in order to illustrate the present invention.

Figure 6A:
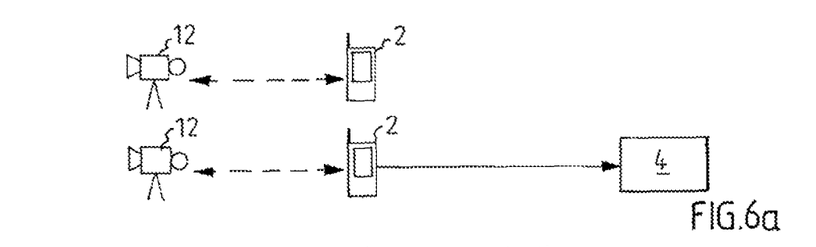
FIGS. 6a and 6b illustrate a first scenario where the present invention is implemented.
Figure 6B:
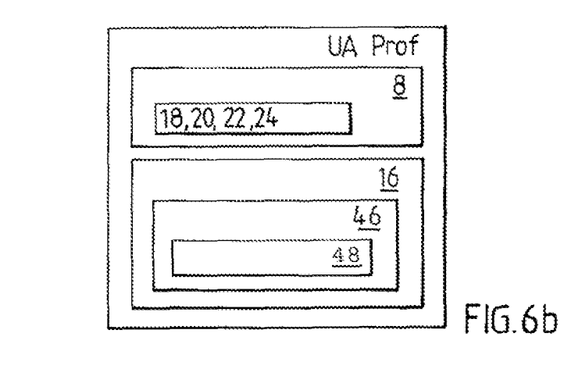

The first scenario is illustrated in FIG. 6a. An attached device 12, e.g. a text-to-speech converter, establishes a session with a terminal 2, e.g. a mobile phone (illustrated above in FIG. 6a). This may be performed prior the terminal establishes a mobile Internet session with an application server 4. FIG. 6b illustrates the protocol profiles, UAProf, comprising the terminal profile 8 with attributes and the attached device's profile 16 including a camera component 46 with its attributes 48.

In this first scenario, e.g., a text-to-speech converter is attached to the terminal. The application may take this into account when deciding what information to deliver and how this information is delivered. The text-to-speech converter is a complementary device and therefore the profile sent from terminal to application contains the capabilities of both the terminal and the text-to-speech converter.

In the second scenario an attached device establishes a mobile Internet session with the application via the terminal that is relaying the session. In this case the attached device works as a substituting device.

Figure 7A:
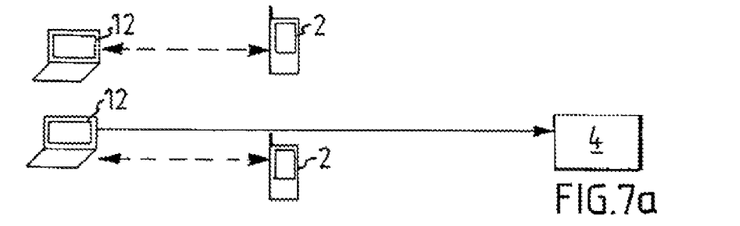
FIGS. 7a and 7b illustrate a second scenario where the present invention is implemented.
Figure 7B:
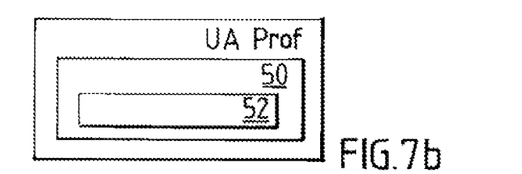

The second scenario is illustrated in FIG. 7a. An attached device 12, e.g. a laptop computer, establishes a session with a terminal 2, e.g. a mobile phone (illustrated above in FIG. 7a). This may be performed prior the terminal establishes a mobile Internet session with an application server 4. FIG. 7b illustrates the protocol profile, UAProf, comprising the attached device's profile including a laptop component 50 with its attributes 52.

In this second scenario the attached device will send its profile along with the session establishment. The application server will receive the profile of the attached device and not that of the mobile phone, since the phone is acting as a sort of router. In this scenario the WAP/HTTP stack terminates in the device, which means that the WAP/HTTP sessions are set up transparently through the mobile phone. The profile will only contain the capabilities of the attached device, e.g. the laptop from which the mobile Internet session is established.

Figure 8A:
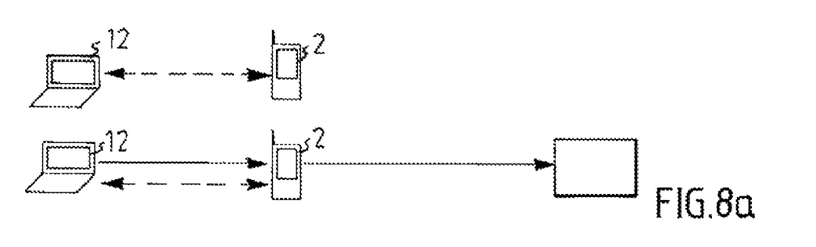
FIGS. 8a and 8b illustrate a third scenario where the present invention is implemented.
Figure 8B:
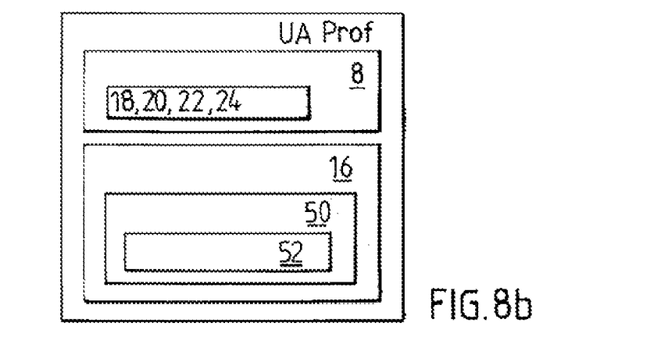

In the third scenario an attached device establishes a mobile Internet session with the application and the terminal is acting as a gateway in between. The third scenario is illustrated in FIG. 8a. An attached device 12, e.g. a laptop computer, establishes a session with a terminal 2, e.g. a mobile phone (illustrated above in FIG. 8a). This may be performed prior the terminal establishes a mobile Internet session with an application server 4. FIG. 8b illustrates the protocol profiles, UAProf, comprising the terminal profile 8 with attributes and the attached device's profile 16 including a laptop component 50 with its attributes 52.

In this scenario the attached device sets up a Mobile Internet session with the mobile phone and the mobile phone sets up a session with the application. The WAP stack is terminated in the mobile phone, but the information received from the application does not terminate in the phone but is passed on from the phone to the attached device. The profile sent, includes the capabilities of both the mobile phone and of the attached device that initiated the Mobile Internet session with the mobile phone. Other devices that may be attached to the mobile phone (e.g. a text-to-speech converter) are not included in the profile, since it is the initiating device that is preferred by the user and therefore is the other attached devices not relevant in this case. In this case the attached device works as a complementary device.

Figure 9A:
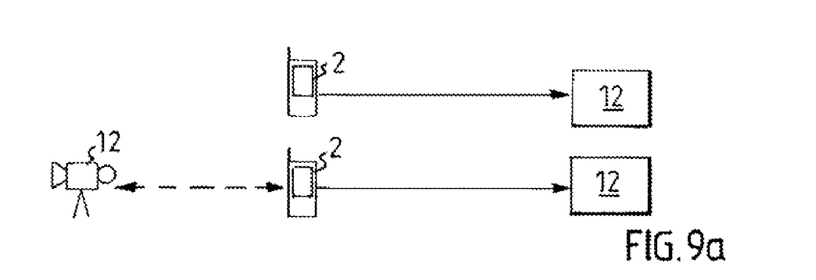
FIGS. 9a and 9b illustrate a fourth scenario where the present invention is implemented.
Figure 9B:
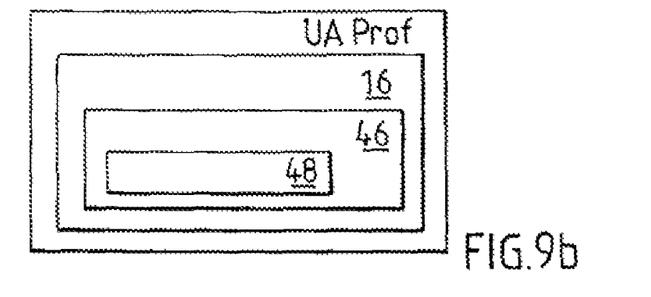

In the fourth scenario the terminal has already established a mobile Internet session with the application when a new device is attached to the terminal. The fourth scenario is illustrated in FIG. 9a. A terminal 2, e.g. a mobile phone, has established a mobile Internet session with an application server 4 (illustrated above in FIG. 9a). An attached device 12, e.g. a camera, is then attached to the terminal and establishes a session with the terminal 2. FIG. 9b illustrates the protocol profiles, UAProf, comprising attached device's profile 16 including a camera component 46 with its attributes 48.

This scenario is applicable, for example, when entering a car equipped with a text-to-speech converter and the user is asked whether the application needs to be informed about the new device available. This will allow the application to reconsider the way the information is presented. The question is not asked for sporadic devices like parking meters, vending machines or printers.

Since there is already an established mobile Internet session between the mobile phone and the application server, the application has already received a profile from the phone. Therefore a Diff_Profile needs to be sent to the application server, specifying what the additional capabilities are. This Diff_Profile is illustrated in FIG. 9b.

Figure 10:
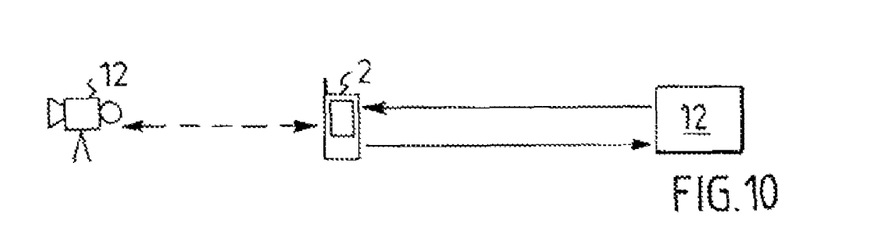
FIG. 10 illustrates a fifth scenario where the present invention is implemented.

In the fifth scenario the application requests the profile prior to establishing a mobile Internet session to the terminal. The application wants to send out information to the terminal and thereby initiates the session and asks the terminal and device for its capabilities, compared to the normal case when the terminal initiates, and directly sends its and its attached devices capabilities. The fifth scenario is illustrated in FIG. 10. An application server 4 requests the profile from a terminal 2, e.g. a mobile phone, to be able to tailor the push information format and content to the attached device 12, e.g. a camera or an MP3-player. The following profile is then returned from the terminal to the application: terminal profile+attached device's profile.

The application will also get the entire profile of the terminal, not overruled by any substituting devices' profiles, since the application might decide to push the information to the phone rather than to one of the substituting devices.

If there is currently no ongoing session between the terminal and the WAP gateway, and the WAP gateway does not store the profiles beyond the duration of a session, the WAP gateway (or the application) can query the mobile phone.

The first four scenarios are pull scenarios, i.e. user initiated, and the last one is a push scenario, i.e. application initiated.

Figure 11:
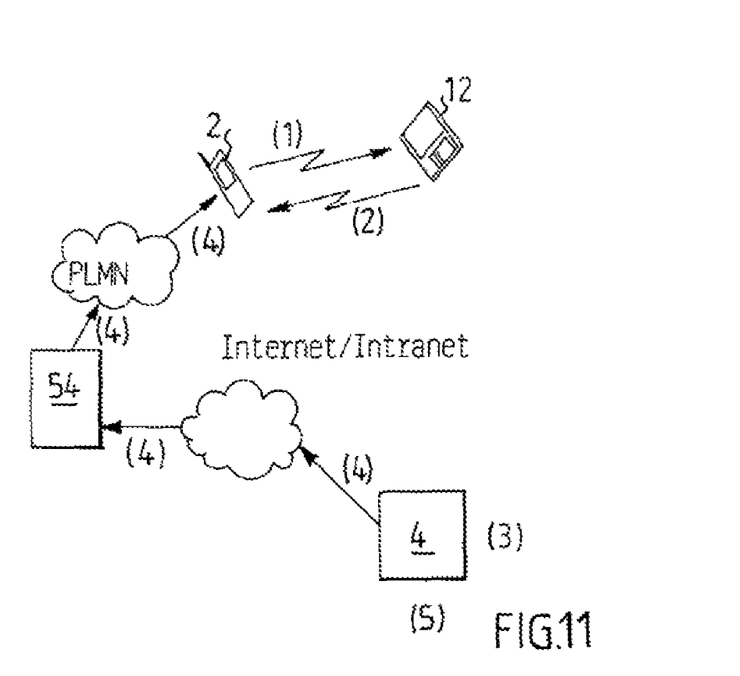
FIG. 11 illustrates a preferred embodiment of the present invention.

FIG. 11 illustrates how an application in an application server 4 can retrieve an attached device's 12 capabilities prior to pushing information in order to be able to tailor the information format and content. The following procedure is performed with references to FIG. 11:

(1). A terminal e.g. a mobile phone enters a car that is equipped with a text-to-speech converter. An ad-hoc network is established between the mobile phone 2 and the attached device.

(2). The profile of the complementary device (in this case the text-to-speech converter) is sent to the mobile phone that updates its profile record.

(3). The user of the mobile phone subscribes to news from a content provider (the application server) and the news application (located in the application server) decides to push the latest news information to the mobile phone.

(4). A terminal capability request (i.e. what is the capability of the mobile phone and any ad-hoc connected devices) is sent to the WAP gateway 54. The WAP gateway is capable of sending WAP push messages to the mobile phone. A MSISDN number is supplied in the request. The MSISDN number could for example be fetched by the application from the personal information related to the news subscription. The WAP gateway sends the push request to the mobile phone. In FIG. 11 PLMN stands for Public Land Mobile Network and could be e.g. UMTS (Universal Mobile Telephone System), GSM (Global Service for Mobile transmission) or GPRS (General Packet Radio Service). It should be noted that the terminal capability request could be sent by the application direct. The use of a WAP gateway illustrated here is only one possible solution.

The terminal capability request ends up in the mobile phone.

The now updated profile is sent back to the application server.

(5). With the new information the application can adopt the information to the new capabilities. In this example the news content is converted to a speech mark-up language.

The speech mark-up language news content is then sent to the mobile phone that uses the text-to-speech converter to present the information to the user.

The present invention is not limited to the above-described preferred embodiments. Various alternatives, modifications and equivalents may be used. Therefore, the above embodiments should not be taken as limiting the scope of the invention, which is defined by the appendant claims.

The invention claimed is:

1. An application server associated with a network service and adapted to communicate with a mobile terminal in a data communication system, the application server comprising:
   a memory; and
   a processor adapted to:
      request, from the mobile terminal, a terminal profile and a device profile, prior to establishing a mobile internet session with the mobile terminal, wherein the terminal profile comprises characteristics of the mobile terminal and wherein the device profile comprises capabilities of a particular device attached to the mobile terminal;
      receive the terminal profile and the device profile from a capability handler in the mobile terminal via a wireless transmission protocol; and
      send tailored information to the mobile terminal, wherein the information is tailored to the terminal profile and the device profile.

2. The application server according to claim 1, wherein the capability handler within the mobile station initiates collection of the device profile.

3. The application server according to claim 1, wherein the device initiates the communication of the device profile to the mobile terminal.

4. The application according to claim 1, wherein the device profile is dynamically updated.

5. The application server according to claim 1, wherein the device profile is implemented as a new schema in a User Agent Profile (UAProf) in Wireless Application Protocol (WAP).

6. The mobile terminal according to claim 1, wherein the mobile terminal communicates with the device using the Bluetooth protocol.

7. The application server according to claim 1, wherein the device is a substituting device, and wherein the device profile of the substituting device partly overrides the terminal profile.

8. The application server according to claim 1, wherein the device is a complementary device, and wherein the device profile of the complementary device is an addition to the terminal profile.

9. The application server according to claim 1, wherein the device is a sporadic device.

10. The application server according to claim 1, wherein the processor is adapted to request the terminal profile and the device profile via a Wireless Application Protocol (WAP) gateway.

11. The application server according to claim 10, wherein the WAP gateway pushes the request to the mobile terminal.

12. A method in an application server associated with a network service and adapted to communicate with a mobile terminal in a data communication system, the method comprising the steps of:

requesting, from the mobile terminal, a terminal profile and a device profile, prior to establishing a mobile internet session with the mobile terminal, wherein the terminal profile comprises characteristics of the mobile terminal and wherein the device profile comprises capabilities of a particular device attached to the mobile terminal;

receiving the terminal profile and the device profile from a capability handler in the mobile terminal via a wireless transmission protocol; and sending tailored information to the mobile terminal, wherein the information is tailored to the terminal profile and the device profile.

13. The method according to claim 12, wherein the device profile in the wireless transmission protocol is dynamically updated.

14. The method according to claim 12, further comprising:
tailoring application service data to be transferred from the application server to the attached device, via the terminal, in accordance with the device profile.

15. The method according to claim 12, wherein the device is a substituting device.

16. The method according to claim 12, wherein the device is a complementary device.

17. The method according to claim 12, wherein the device is a sporadic device.

18. The method according to claim 12, wherein the device further communicates with the mobile terminal using the Bluetooth protocol.

19. The method according to claim 12, wherein the device profile is implemented as a new schema in the User Agent Profile (UAProf) in Wireless Application Protocol (WAP).

20. The method according to claim 12, wherein the mobile terminal initiates identification of the device profile.

21. The method of claim 12, wherein the device initiates identification of the device profile.

22. The method of claim 12, wherein the requesting step is performed via a Wireless Application Protocol (WAP) gateway.

23. The method of claim 22, wherein the WAP gateway pushes the request to the mobile terminal.

* * * * *

UNITED STATES PATENT AND TRADEMARK OFFICE
CERTIFICATE OF CORRECTION

PATENT NO. : 8,285,213 B2  
APPLICATION NO. : 13/230204  
DATED : October 9, 2012  
INVENTOR(S) : Skog et al.

Page 1 of 1

It is certified that error appears in the above-identified patent and that said Letters Patent is hereby corrected as shown below:

On the Title Page, in Item (75), under "Inventors", in Column 1, Line 2, delete "Kista (SE)" and insert -- Breda (NL) --, therefor.

In Column 1, Line 27, delete "www.waporum.org," and insert -- www.wapforum.org, --, therefor.

In Column 9, Line 1, Claim 4, delete "application" and insert -- application server --, therefor.

Signed and Sealed this  
Fifth Day of February, 2013

Teresa Stanek Rea  
*Acting Director of the United States Patent and Trademark Office*